United States Patent [19]
Gaio

[11] 3,833,190
[45] Sept. 3, 1974

[54] SAFETY GUST LOCK FOR AIRCRAFT CONTROLS

[76] Inventor: Alexander Gaio, 116 Oakside Dr., Smithtown, N.Y. 11787

[22] Filed: May 29, 1973

[21] Appl. No.: 364,818

[52] U.S. Cl. .................................. 244/83 A, 74/495
[51] Int. Cl. ............................................. B64c 13/14
[58] Field of Search........ 244/83 A, 83 R, 1 R, 121; 74/495; 70/211, 199; 180/82 R; 280/296

[56] References Cited
UNITED STATES PATENTS

| 1,436,773 | 11/1922 | Moore | 74/495 X |
| 1,535,266 | 4/1925 | Strange | 74/495 |
| 2,035,231 | 3/1936 | Haberstro | 244/83 A |
| 2,406,233 | 8/1946 | Linnert | 244/83 A |
| 3,298,242 | 1/1967 | Smith | 74/495 |
| 3,330,504 | 7/1967 | Lewis | 244/83 A |

*Primary Examiner*—Trygve M. Blix
*Assistant Examiner*—Barry L. Kelmachter
*Attorney, Agent, or Firm*—Harvey W. Mortimer

[57] ABSTRACT

A safety gust lock for aircraft controls in which the control column is locked through an elastic member to a fixed point on the aircraft.

15 Claims, 7 Drawing Figures

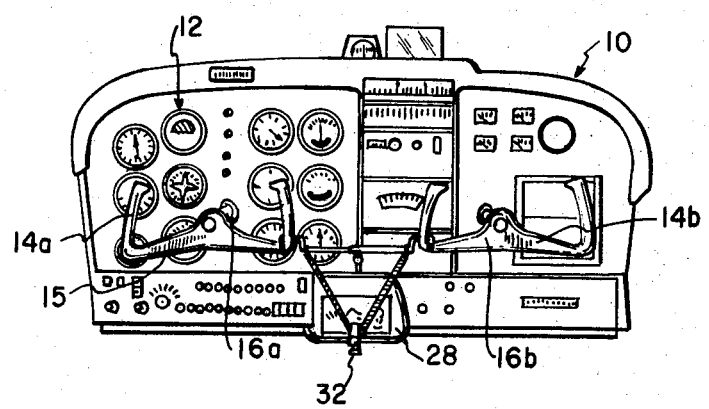
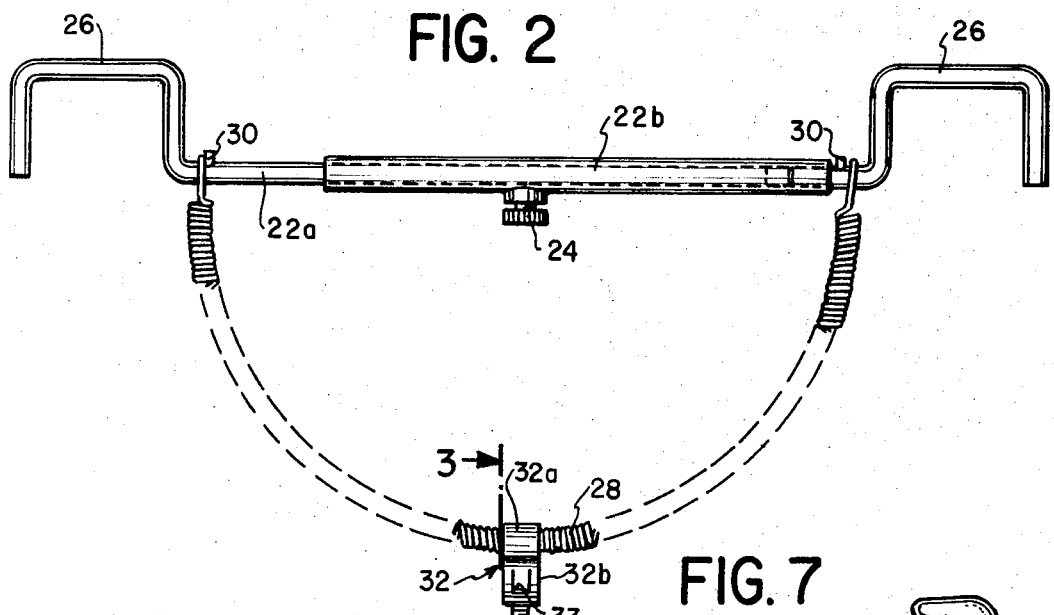
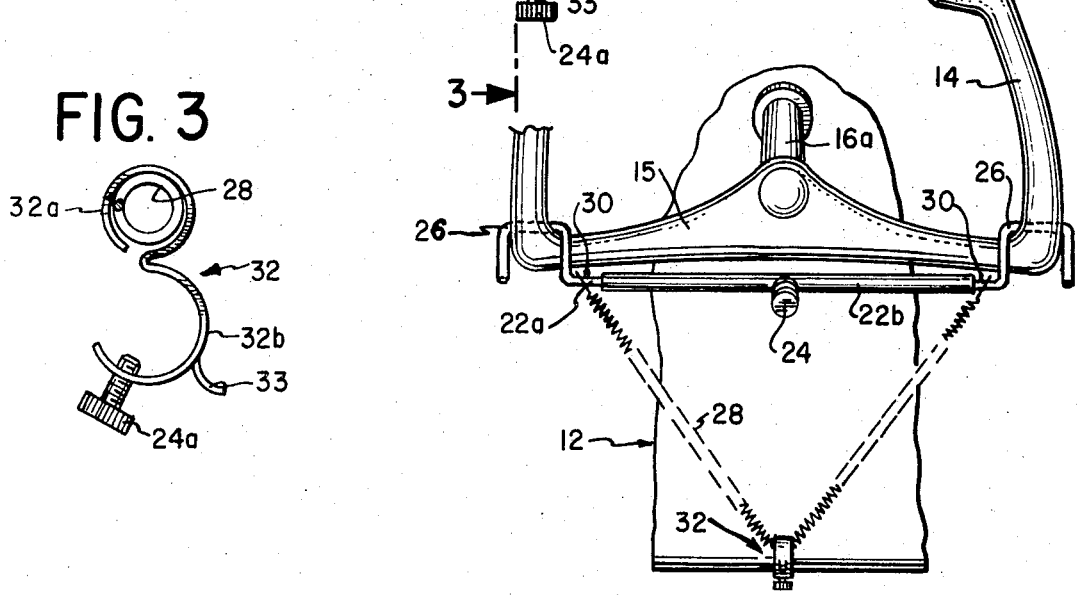

SAFETY GUST LOCK FOR AIRCRAFT CONTROLS

BACKGROUND OF THE INVENTION

Various devices have been proposed to lock the control surfaces of a parked aircraft, such as its ailerons and elevators, against the effects of wind gusts and external manual manipulation. In these devices a rigid linkage is provided between the aircraft's control column, usually the "wheel" or "stick," and a fixed point. One such device is shown in the Phillips U.S. Pat. No. 3,169,731 in which a rigid linkage is connected between the control column and the aircraft's rudder pedal. Another similar device is disclosed in U.S. Pat. No. 2,967,681 to Berquist where a rigid linkage is connected between the control stick and a pair of fixed points on the aircraft. The linkages in both patents prevent movement of the control column and, therefore, the associated aircraft control surfaces.

In the prior devices where a rigid linkage is used for the lock, the control surfaces are not free to move even slightly in response to external forces such as wind or hand pressure. Thus, application of such external forces of sufficiently high strength possibly can cause damage to the mountings, cables, pulleys, and linkages of the control surfaces. For example, forces applied in a manner to move one aileron up and the other down creates a situation where damage can occur to the associated control system cables, pulleys and linkages when a rigid lock is employed.

Another type of gust lock makes use of wedges, clamps and other similar devices which are attached directly to the aircraft control surfaces. For example, a wedge can be placed between the aileron and the wing to hold the aileron fixed. Such devices are relatively difficult to put in place, can be easily removed by unauthorized persons, and are subject to accidentally being left fully or partially in place during a take-off. In addition, the external locks are also generally rigid and are subject to the same disadvantages as the locks of the two patents.

SUMMARY OF THE INVENTION

The present invention is also directed to a safety gust lock for aircraft control surfaces. Here, the lock mounted between the control column and a fixed point of the aircraft is at least partially resilient or elastic. This provides a certain amount of play or give in the system between the external control surface and the control column to avoid any damage to the control surfaces or the control system. In the preferred embodiment of the invention, a spring is utilized between the control column of the aircraft and the fixed point which makes the external aircraft control surfaces and their associated linkages to the control column non-rigid to the open environmental forces applied to the control surfaces.

It is therefore an object of the present invention to provide a novel safety gust lock for aircraft.

A further object is to provide a safety gust lock utilizing a member which is at least partially non-rigid, thereby permitting a limited amount of movement of the aircraft control surfaces in response to external forces.

Another object is to provide a safety gust lock for aircraft having dual control columns.

An additional object is to provide a safety gust lock which utilizes a spring member connected between the aircraft control column and a fixed point on the aircraft.

Other objects and advantages of the present invention will become more apparent upon reference to the following specification and annexed drawings, in which:

FIG. 1 is a perspective view showing the device in use in a dual control column aircraft;

FIG. 2 is a plan view of the lock device showing additional details;

FIG. 3 is a sideview of the slidable clip;

FIG. 7 is a view of another embodiment of the invention utilized with a different type of aircraft.

DETAILED DESCRIPTION

Figure 4:
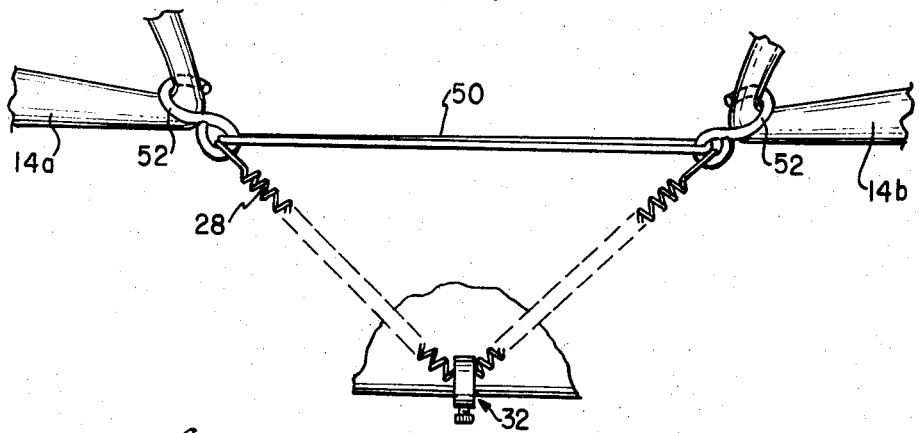
FIGS. 4–6 are views of further embodiments of the invention used for dual wheel aircraft.

Referring to the drawings, FIG. 1 shows in generalized form the control panel 10 of an aircraft containing various instruments, dials, gauges 12. Adjacent the control panel 10 are a pair of control wheels 14a and 14b, each of which is attached to a respective control column 16a and 16b. Each wheel 14 includes a cross piece 15.

The control columns, which are mechanically linked together to act in tandem, in turn are connected through suitable conventional mechanical linkages, such as gears, pulleys, cables, etc., (not shown) to the aircraft control surfaces. The wheels 14 and control column usually control the ailerons and the elevators of the aircraft (not shown). As a general proposition, moving a control column 16 forward or backward will move the elevators down and up, respectively, causing the aircraft to dive and climb. Turning a control wheel 14 to the left or right causes the ailerons to move in opposite directions causing the aircraft to bank. All of the foregoing is conventional.

The gust lock 20 of the invention includes a rigid bar 22 which is preferably made of two pieces 22a and 22b. The two pieces 22a and 22b telescope with respect to each other so that the overall length of the locking device can be adjusted to permit it to be used with different type aircraft. A thumb screw 24 is threaded into the larger diameter piece 22b to hold the length of the bar fixed once it is established. It should be understood, of course, that bar 22 can be of one solid piece if adjustable length is not desired.

The bar 22 terminates at each end in a gripping member 26. The gripping member is shown as being generally U-shaped to fit over the cross piece 15 of the wheel. As seen in FIG. 1, each gripping member is fastened to one of the wheels so that there is rigid connection between wheels 14 and their control columns 16. It should be understood that gripping member 26 can be of any shape suitable to produce a firm grip on the wheel.

An elongated elastic member 28, preferably a coil spring, has one of its ends 29 fastened to the bar 22 adjacent a respective gripping member 26. The ends 29 of the spring can be hooked over the bar 22 and staked or welded to prevent movement. As an alternative, as shown in FIG. 2, an ear 30 is formed on each end of the bar adjacent the origin of the respective gripping member 26 to hold the hooked end 29 of the spring in place.

The central portion of spring 28 loops into a generally semi-circular configuration when the device is not in use. This is shown best in FIG. 2. A hook, or clamp, 32 is slidably mounted on spring 28. As shown in FIG. 3, the upper portion 32a of the hook can be fully or partially closed around the spring to insure that it will not fall off. The inner diameter of the upper portion 32a of the clamp is slightly larger than the outer diameter of the spring 28 so that the hook can slide along spring 28.

The lower portion 32b of the clamp is also curved to fit over or under a fixed portion of the aircraft, for example, the under lip of control panel 10. A thumb screw 24a is fitted in the lower clamp portion 32b to provide a firm engagement with the fixed portion of the aircraft. A tab 33 is also fastened to clamp portion 32b to assist in the placement and the removal of the clamp. It should be understood, of course, that the thumb screw and tab are not necessary in all applications.

As seen in FIG. 1, the gripping members 26 at the end of the bar 22 are placed over the cross-pieces 15 of the respective wheels 14. The members lock adjacent the point where the cross-piece 15 is attached to the outer hub of the wheel. The clamp 32 is pulled toward the fixed point on the aircraft to which it is to be attached. This exerts a force on the spring 28 to distort its generally semi-circular shape. When the clamp 32 is attached to the lip on the underside of the control panel, the control wheels 14 and their respective columns 16 are forced in the forward position (elevators down) and fastened through the spring to the control panel. A triangle vector force configuration is set up with the spring forming two legs of the triangle and bar 22 forming the third leg.

The spring and lock constrains the motion of the wheels 14 and the control columns 16 both axially and circumferentially. The spring coefficient is selected so that the spring will extend upon application of a force somewhat less than would be needed to damage the control system. This force is transmitted to the spring through the control system. That is, the control column is permitted to move backward and the wheel is permitted to turn either left or right against the force of the elastic spring 28, when a sufficiently large force is applied. In the case of the wheel turning, the spring 28 slides through the enlarged upper part 32a of the clamp. Because of the movement permitted, the control surfaces are not entirely rigid. Also, the external force acts against an elastic member so that the permitted movement is gradual rather than abrupt as one or both legs of the spring extend of compress. In addition, once the external force is removed, the spring returns the control wheels and columns to their locked position. The return will also be relatively rapid. Where the external force applied to the control surfaces is less than that needed to distort the spring, the control surfaces will remain in their locked position.

In a typical situation, a small amount of hand pressure is supplied to one of the control surfaces to move it from the position in which it is locked by the gust lock. Due to the presence of the elastic member there is an amount of "give" in the gust lock which permits the control column and/or wheel to move. Therefore, the control surface or control system will not be damaged.

FIG. 4 shows another embodiment of the invention in which the rigid bar 22 is replaced by an elastic member 50 whose ends are connected to the ends of spring 28 in any suitable manner. Member 50 can be a spring, a piece of elastic rubber, etc. A hook 52 is provided at each end of the spring 28. Each hook 52 attaches over a respective wheel 14 at the juncture of the cross piece 15. Spring 28 can slide within clamp 32 as in FIGS. 1–3.

The operation of the apparatus of FIG. 4 is similar to that previously described with respect to FIGS. 1–3. Here, However, the vector system for the transmission of forces between the wheels 14a, 14b is different since rigid member 22 has been replaced by an elastic member 50. The apparatus of FIG. 4 provides the same advantages previously discussed with respect to FIGS. 1–3.

Figure 5:
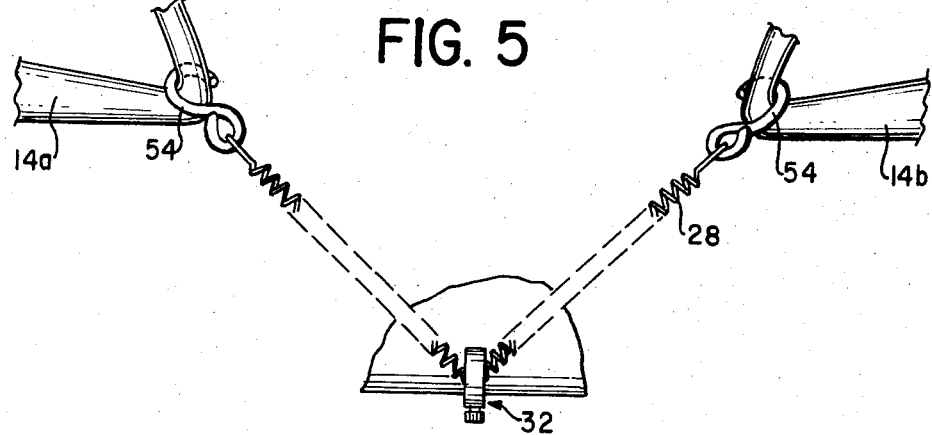

FIG. 5 shows a further embodiment in which there is no coupling member, such as 22 or 50, between the two wheels 14a, 14b. A hook 54 is attached to each free end of the spring 28. The hook fits over a cross piece 15 of the respective wheel 14. The clip 32 is as previously described.

The vector system produced by the apparatus of FIG. 5 is different from that of either FIGS. 1–3 or FIG. 4 since there is no coupling member between the wheels 14a, 14b. However, spring 28 still provides the restraining force and the spring can move through clamp 32.

Figure 6:
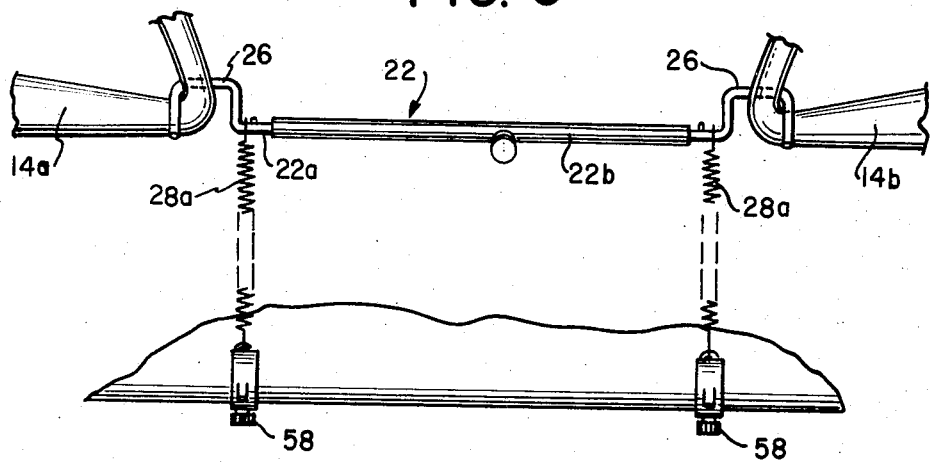

FIG. 6 shows a further embodiment in which the rigid bar 22 is again connected between the wheels 14a, 14b. Here, the spring has been split into two parts 28a, 28b and a clamp 58 is attached to the free end of each spring section 28. Clamp 58 is similar to that shown in FIG. 3. Here, however, an upper portion corresponding to 32a need not be provided. Each clamp 58 is attached to a fixed point on the aircraft instrument panel. The spring sections 28a, 28b provide the restraining force for the respective wheels 14a, 14b and the coupling of the forces is through the bar 22.

FIG. 7 shows another embodiment of the invention in which the safety gust lock is used with an aircraft of the type having only a single control wheel. The principal difference between the embodiment shown in FIG. 7 and those of FIGS. 1–6, is that the bar 22 has a length which corresponds substantially to the cross-piece 15 of the wheel. The gripping members 26 lock inside of the hub of the wheel 14 on the cross-piece 15. As before, a clamp 32 slides on the spring 28. The spring is fastened to the underside of the control panel.

The lock of FIG. 7 operates in the manner previously described to permit limited turning movement of wheel 14 and forward and backward motion of the control system. As should be apparent, rather than using the bar 22, the ends of the spring can be attached directly to the cross-piece of the wheel. However, this is not as convenient as the use of the bar.

The gust lock of the various embodiments of the subject invention has several advantages.

It is put in place entirely within the cabin of the aircraft to lock the aircraft controls and no connections external of the aircraft are needed. Therefore it is inaccessible from outside of the cabin of the aircraft when the cabin is locked.

The lock provides wind and tamper-proof strain relief for the control surfaces. In doing so it avoids premature wear of aircraft controls and their associated linkages in the same manner as fixed gust locks used with aircraft parked in an open environment. However, it is not subject to the disadvantages of locks using rigid linkages.

The lock of the present invention is also relatively inexpensive to manufacture and simple in its use. It can also easily accommodate to single or dual wheel type aircraft. In addition, where the lock is utilized with a dual wheel aircraft, the telescoping control bar can accommodate various spacings of the control wheel.

As a further advantage, the gust lock can be quickly put into place and be removed. The lock is clearly visible to the pilot while it is still fastened. Therefore, the pilot must remove the gust lock in order to be able to operate the controls. This does away with the hazard of taking off with the controls arrested as sometimes happens with fixed external gust locks which are accidentally left fully or partially on.

As should also be apparent, the lock of the subject invention requires no changes or structural modifications to the aircraft with which it is to be used.

What is claimed is:

1. Locking apparatus for at least one movable control column and control wheel of an aircraft comprising an elastic member, means for connecting at least one end of said elastic member to a control wheel, and means movable along said elastic member for holding said elastic member to a fixed point on the aircraft.

2. Locking apparatus as in claim 1 wherein said means for connecting the elastic member to a wheel comprises a rigid bar, and means at each end of the bar for connection to the wheel.

3. Locking apparatus as in claim 2 wherein each end of the bar is adapted to be connected to a point on a respective control wheel of an aircraft having two control wheels.

4. Locking apparatus as in claim 2 wherein the connecting means at each end of the bar comprises a hook.

5. Locking apparatus as in claim 2 wherein said bar is formed of two sections which are telescoped one within the other to adjust the bar length.

6. Locking apparatus as in claim 2 wherein said elastic member is elongated, each end of the elastic member being attached adjacent a respective end of the bar.

7. Locking apparatus as in claim 1 wherein said elastic member comprises a spring.

8. Locking apparatus for use in an aircraft of the type having dual control columns and a respective wheel for each column which is used to control the movement of control surfaces of the aircraft comprising an elastic member, means for connecting a free end of said elastic member to a point on each of said control wheels, and means for holding said elastic member to a fixed point on the aircraft to provide a lock for the control columns whose effect is limited by the elasticity of said elastic member.

9. Locking apparatus as in claim 8 further comprising rigid means coupled between each of said dual control wheels.

10. Apparatus as in claim 9 wherein said rigid means includes at each end therof a means for connecting a free end of said elastic member to a respective control means.

11. Locking apparatus as in claim 8 wherein said holding means is movable along said elastic member.

12. Locking apparatus for the movable control column and wheel of an aircraft comprising, a bar having means at each end for attachment to a point on a wheel, an elongated elastic member having each end attached to said bar adjacent a respective end thereof, and means connected intermediate the ends of said elastic member for attaching said member to a fixed point on the aircraft.

13. Locking apparatus as in claim 12 further comprising means for adjusting the length of said bar.

14. Locking apparatus as in claim 12 wherein said means for attaching the elastic member to a fixed point is movable along said elastic member.

15. Apparatus as in claim 8 wherein the elastic member comprises a single member, each end of said member being connected to a respective wheel and said holding means is attached to an intermediate point of said elastic member.

* * * * *